United States Patent
Jhuang et al.

(10) Patent No.: US 10,488,943 B2
(45) Date of Patent: Nov. 26, 2019

(54) KEY STRUCTURE

(71) Applicant: Primax Electronics Ltd., Taipei (TW)

(72) Inventors: Chuang-Shu Jhuang, Taipei (TW); Zhi-Hui Zeng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/189,989

(22) Filed: Nov. 13, 2018

(65) Prior Publication Data
US 2019/0220101 A1 Jul. 18, 2019

(51) Int. Cl.
*H01H 3/12* (2006.01)
*G06F 3/02* (2006.01)
*H01H 13/7073* (2006.01)

(52) U.S. Cl.
CPC ............. *G06F 3/0202* (2013.01); *H01H 3/12* (2013.01); *H01H 13/7073* (2013.01); *H01H 2003/127* (2013.01)

(58) Field of Classification Search
CPC .. H01H 3/125; H01H 13/705; H01H 13/7065; H01H 13/704; H01H 13/14; H01H 2221/044; H01H 13/85; H01H 2003/008; H01H 2215/00; H01H 13/00; H01H 13/02; H01H 13/18; H01H 13/20; H01H 13/26; H01H 13/28; H01H 13/50; H01H 13/70; H01H 2215/028; H01H 3/00; H01H 3/02; H01H 3/12; H01H 3/32; H01H 3/40; H01H 5/04; H01H 9/20
See application file for complete search history.

(56) References Cited

U.S. PATENT DOCUMENTS

| | | | | |
|---|---|---|---|---|
| 5,874,696 | A * | 2/1999 | Hayashi | G06F 1/1616 200/345 |
| 10,109,437 | B1 * | 10/2018 | Li | H01H 13/85 |
| 10,224,158 | B2 * | 3/2019 | Lee | H01H 13/705 |
| 10,236,141 | B1 * | 3/2019 | Tsai | H01H 13/85 |
| 2017/0213663 | A1 * | 7/2017 | Jhuang | H01H 13/023 |
| 2018/0190446 | A1 * | 7/2018 | Chen | H01H 13/20 |
| 2019/0252136 | A1 * | 8/2019 | Wu | H01H 3/125 |

* cited by examiner

*Primary Examiner* — Ahmed M Saeed
(74) *Attorney, Agent, or Firm* — Kirton McConkie; Evan R. Witt

(57) ABSTRACT

A key structure includes a base plate, a structural plate, a sound generation assembly and a keycap. The structural plate is installed on the base plate. The sound generation assembly includes a shaft body and a cantilever element. The cantilever element is protruded from a side of the shaft body. The structural plate is covered by the keycap. The keycap includes a first protrusion post and a second protrusion post. A first space and a second space are formed between the first protrusion post and the second protrusion post. The first space and the second space are not aligned with each other. The cantilever element is movable within the first space and the second space. Consequently, the feedback of a click sound is generated.

13 Claims, 4 Drawing Sheets

KEY STRUCTURE

FIELD OF THE INVENTION

The present invention relates to a key structure, and more particularly to a mechanical key structure of a mechanical keyboard.

BACKGROUND OF THE INVENTION

A keyboard is one of the input devices that are widely used in a computer system. For optimizing the operation experiences of the users, different types of keyboards are needed according to different input requirements. For example, the keyboard for inputting characters and commands uses a rubber dome as a means of elastically restoring the key structure after the key structure is depressed. However, the tactile feel of depressing the rubber dome is monotonous. In case that the keyboard is operated to play the computer game, the keyboard is unable to provide more clear tactile feedback. Consequently, a mechanical keyboard with mechanical key switches is often used to operate the function of the computer game.

Generally, a key structure of a conventional mechanical keyboard comprises a keycap, a sliding shaft, a spring, an upper fixing case, a lower fixing case, a fixing frame and a base plate. The sliding shaft is covered by the keycap. A bulge is protruded from a bottom end of the sliding shaft. A portion of the spring is sheathed around the bulge. When the upper fixing case and the lower fixing case are combined together, an accommodation space is defined between the upper fixing case and the lower fixing case. A side of the spring away from the sliding shaft is penetrated through the upper fixing case and the lower fixing case. Moreover, an end of the spring is protruded out of the lower fixing case. The lower fixing case is installed on the base plate. After the end of the spring is protruded out of the lower fixing case, the end of the spring is connected with the base plate. The fixing frame is arranged around the lower fixing case.

Since the key structure of the conventional mechanical keyboard is very complicated, the assembling structure and the assembling process of the key structure are very complicated. In other words, the assembling cost is high. Moreover, the key structure of the conventional mechanical keyboard cannot generate the feedback of a click sound. When the key structure of the mechanical keyboard is depressed, the user cannot recognize whether the key structure of the mechanical keyboard is really depressed. Moreover, since the key structure of the mechanical keyboard is complicated, the key structure occupies a lot of space. In other words, it is difficult to design a slim-type mechanical keyboard. Therefore, there is a need of providing an improved key structure of a mechanical keyboard in order to overcome the drawbacks of the conventional technologies.

SUMMARY OF THE INVENTION

An object of the present invention provides key structure of a mechanical keyboard that is capable of generating a mechanical sound.

In accordance with an aspect of the present invention, there is provided a key structure. The key structure includes a base plate, a structural plate, a sound generation assembly, a keycap and an elastic mechanism. The structural plate is installed on the base plate, and includes a slot. The sound generation assembly includes a shaft body, a cantilever element and an elastic element. An end of the shaft body is connected with the base plate. A side of the shaft body is penetrated through the slot. The cantilever element is protruded from another side of the shaft body. A first end of the elastic element is connected with the shaft body. The keycap is aligned with the structural plate. A second end of the elastic element is away from the shaft body and connected with the keycap. A first protrusion post and a second protrusion post are disposed on a bottom surface of the keycap. The first protrusion post and the second protrusion post are penetrated through the slot. A first space is formed between a lower end of the first protrusion post and a lower end of the second protrusion post. A second space is formed between an upper end of the first protrusion post and an upper end of the second protrusion post near the keycap. The second space is in communication with the first space. The first space and the second space are not aligned with each other. The cantilever element is received within the first space and movable within the first space and the second space. The elastic mechanism is arranged between the keycap and the structural plate. A first side and a second side of the elastic mechanism are connected with the structural plate and the keycap, respectively. While the keycap is moved upwardly, a bottom surface of the first protrusion post presses the cantilever element and provides a downward force to the cantilever element. In response to the downward force, the cantilever element is moved along the bottom surface of the first protrusion post and moved from the first space to the second space. When the cantilever element is just moved into the second space, the cantilever element rocks and knocks on the second protrusion post to generate a click sound. Consequently, when the key structure is pressed down, the feedback of the click sound is generated.

In an embodiment, a side of the lower end of the first protrusion post near the second protrusion post has a guiding slant, and a side of the lower end of the second protrusion post facing the first protrusion post has a clicking part. The first space is arranged between the guiding slant and the clicking part. The first space and the second space are not aligned with each other. While the cantilever element is moved along the guiding slant, the cantilever element knocks on the clicking part. Preferably, a side of the cantilever element away from the shaft body has a pressing slant. The pressing slant is slidably contacted with the guiding slant and movable along the guiding slant. Preferably, a side of the clicking part near the guiding slant has a clicking slant. The clicking slant and the guiding slant are in parallel with each other. The cantilever element is permitted to knock on the clicking slant.

In an embodiment, the shaft body includes a pedestal and a bulge. The bulge is protruded from the pedestal. The cantilever element is protruded from a side of the pedestal near the bulge. The pedestal is penetrated through the slot. An end of the pedestal away from the bulge is connected with the base plate. The elastic element is sheathed around the bulge and clamped between the pedestal and the keycap. The first end of the elastic element is fixed on the pedestal. The second end of the elastic element is fixed on the keycap. Preferably, the sound generation assembly further includes a fixing seat. A first end of the fixing seat is connected with the base plate. A second end of the fixing seat is connected with an end of the pedestal away from the bulge. The pedestal is fixed on the base plate through the fixing seat.

In an embodiment, the elastic mechanism further includes a thin film layer and an elastomer. The thin film layer covers a top surface of the structural plate. The thin film layer includes a perforation. The bulge, the elastic element, the first protrusion post and the second protrusion post are penetrated through the perforation of the thin film layer. A first end of the elastomer is connected with the thin film layer. A second end of the elastomer is connected with the keycap. Preferably, the elastomer is dome-shaped, a ring-shaped convex structure is externally extended from a bottom side of the elastomer, the ring-shaped convex structure is connected with the thin film layer, and a top side of the elastomer is connected with the keycap.

In an embodiment, the key structure further includes an inner supporting frame and an outer supporting frame. The outer supporting frame is coupled to an external portion of the inner supporting frame. A middle region of a frame body of the outer supporting frame is pivotally coupled to a middle region of a frame body of the inner supporting frame. The inner supporting frame includes a first inner coupling part and a second inner coupling part. The first inner coupling part and the second inner coupling part are respectively located at two opposite sides of the inner supporting frame. The outer supporting frame includes a first outer coupling part and a second outer coupling part. The first outer coupling part and the second outer coupling part are respectively located at two opposite sides of the outer supporting frame. The first inner coupling part is pivotally coupled to the keycap. The second inner coupling part is pivotally coupled with the structural plate. The first outer coupling part is pivotally coupled to the structural plate. The second outer coupling part is pivotally coupled to the keycap. The slot is formed in a side of the structural plate. The structural plate includes two first coupling brackets and two second coupling brackets. The two first coupling brackets are disposed on the structural plate and located near the slot. The two second coupling brackets are disposed on the structural plate and located away from the slot. Two ends of the first outer coupling part are respectively pivotally coupled to the two first coupling brackets. Two ends of the second inner coupling part are respectively pivotally coupled to the two second coupling brackets.

In an embodiment, the thin film layer further includes a first opening and a second opening. The perforation is located over the slot. The first opening is formed in a side of the thin film layer near the perforation. The first opening is in communication with the perforation. The second opening is formed in a side of the thin film layer away from the perforation. The first coupling brackets and the first outer coupling part are penetrated through the first opening. The second coupling brackets and the second inner coupling part are penetrated through the second opening. In an embodiment, the structural plate further includes a recess. The recess is arranged between the two first coupling brackets. The first outer coupling part is received within the recess. Preferably, the elastic element is a spring, the elastomer is made of rubber, silicone, resin or casting polyurethane, and the cantilever element is made of a flexible material.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
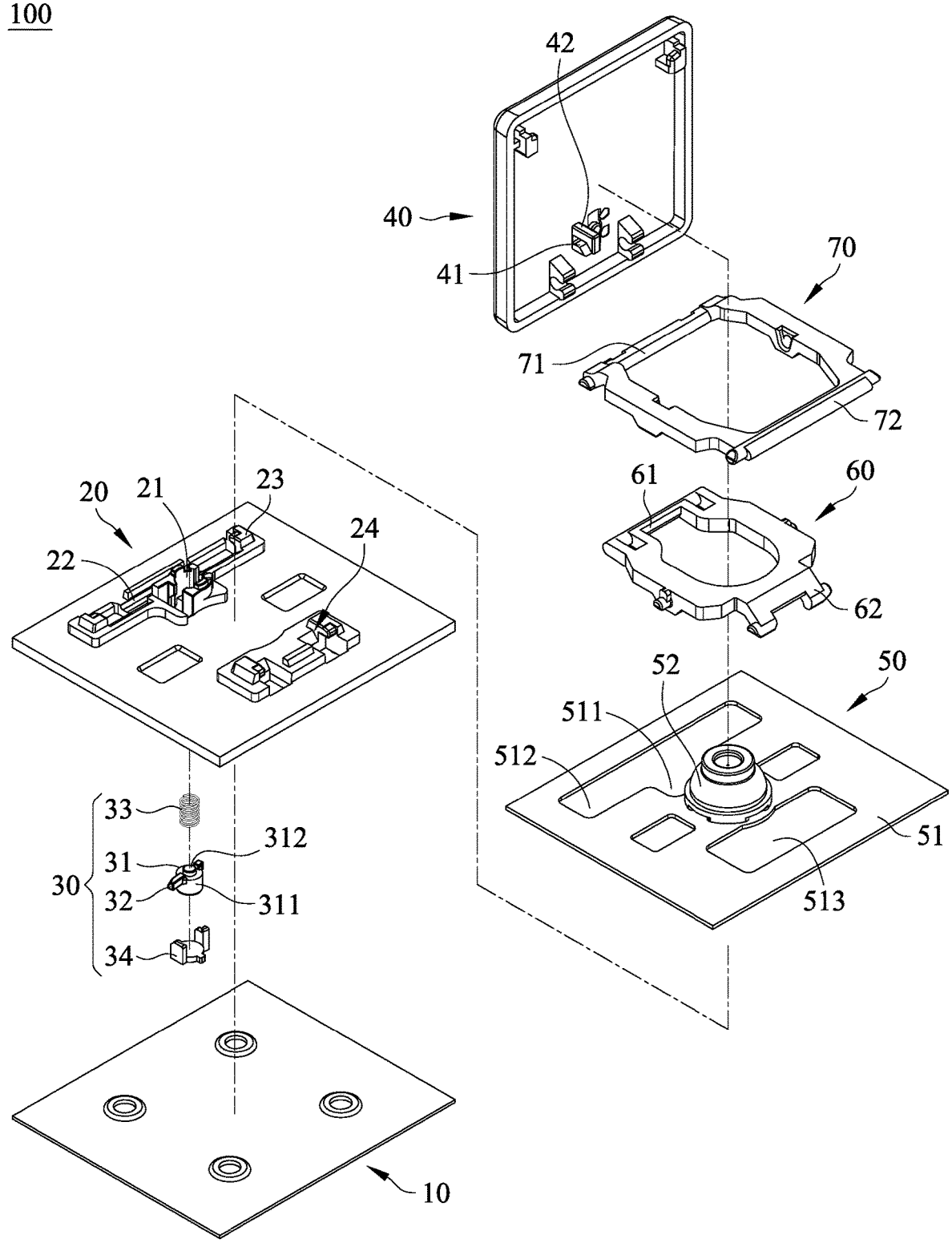
FIG. 1 is a schematic exploded view illustrating a key structure according to an embodiment of the present invention.
Figure 2:
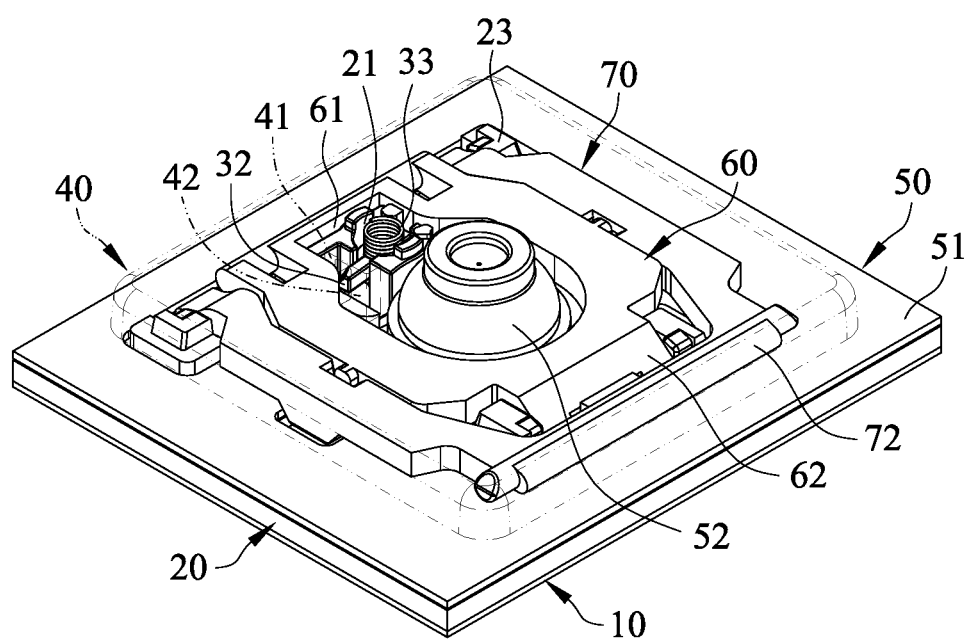
FIG. 2 is a schematic assembled view illustrating the key structure according to the embodiment of the present invention.
Figure 3:
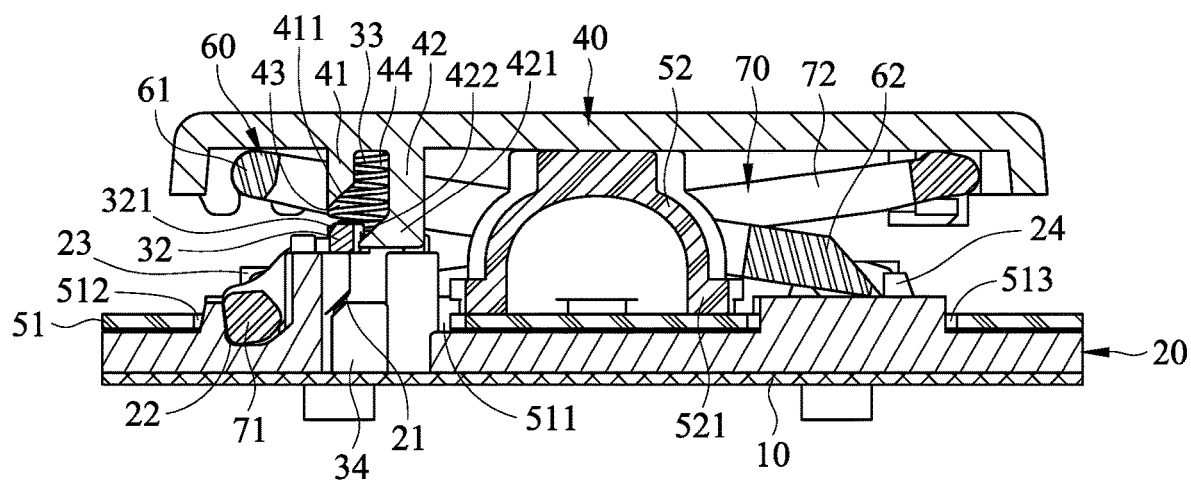
FIG. 3 is a schematic cross-sectional view illustrating the key structure according to the embodiment of the present invention.

Please refer to FIGS. 1, 2 and 3. FIG. 1 is a schematic exploded view illustrating a key structure according to an embodiment of the present invention. FIG. 2 is a schematic assembled view illustrating the key structure according to the embodiment of the present invention. FIG. 3 is a schematic cross-sectional view illustrating the key structure according to the embodiment of the present invention. The key structure 100 is suitably used as a mechanical key structure of a mechanical keyboard. When the key structure 100 is depressed, a control signal or a data is inputted into a computer of a video game console. In this embodiment, the key structure 100 comprises a base plate 10, a structural plate 20, a sound generation assembly 30, a keycap 40, an elastic mechanism 50, an inner supporting frame 60 and an outer supporting frame 70.

The structural plate 20 is installed on the base plate 10. A slot 21 and a recess 22 are formed in the structural plate 20. Moreover, the structural plate 20 comprises two first coupling brackets 23 and two second coupling brackets 24. The slot 21 is located at a first side of the structural plate 20. The recess 22 is located beside the slot 21. The two first coupling brackets 23 are disposed on the structural plate 20 and located near the slot 21. Moreover, the recess 22 is arranged between the two first coupling brackets 23. The two second coupling brackets 24 are disposed on the structural plate 20 and located away from the slot 21. That is, the slot 21 is arranged between the two first coupling brackets 23 and the two second coupling brackets 24.

The sound generation assembly 30 comprises a shaft body 31, a cantilever element 32, an elastic element 33 and a fixing seat 34. The shaft body 31 comprises a pedestal 311 and a bulge 312. The bulge 312 is protruded from the pedestal 311. The pedestal 311 is penetrated through the slot 21. An end of the pedestal 311 away from the bulge 312 is connected with the fixing seat 34. The cantilever element 32 is protruded from a side of the pedestal 311 near the bulge 312. The cantilever element 32 is made of a flexible material. A side of the cantilever element 32 away from the shaft body 31 has a pressing slant 321. The elastic element 33 is sheathed around the bulge 312. A first end of the fixing seat 34 is connected with the base plate 10. A second end of the fixing seat 34 is connected with an end of the pedestal 311 away from the bulge 312. The pedestal 311 is fixed on the base plate 10 through the fixing seat 34. For example, the elastic element 33 is a spring.

The keycap 40 is aligned with the structural plate 20. The elastic element 33 is clamped between the pedestal 311 and the keycap 40. A first end of the elastic element 33 is fixed on the pedestal 311. A second end of the elastic element 33 is fixed on the keycap 40. A first protrusion post 41 and a second protrusion post 42 are disposed on a bottom surface of the keycap 40. A first space 43 is formed between a lower end of the first protrusion post 41 and a lower end of the second protrusion post 42. A second space 44 is formed between an upper end of the first protrusion post 41 and an upper end of the second protrusion post 42 that are located near the keycap 40. The second space 44 is in communication with the first space 43. Preferably, the first space 43 and the second space 44 are not aligned with each other. A side of the lower end of the first protrusion post 41 near the second protrusion post 42 has a guiding slant 411. A side of the lower end of the second protrusion post 42 facing the first protrusion post 41 has a clicking part 421. After the first protrusion post 41 and the second protrusion post 42 are penetrated through the slot 21 of the structural plate 20, the side of the first protrusion post 41 with the guiding slant 411 and the side of the second protrusion post 42 with the clicking part 421 are protruded out of the slot 21 of the structural plate 20. The first space 43 is arranged between the guiding slant 411 of the first protrusion post 41 and the clicking part 421 of the second protrusion post 42. Moreover, the side of the clicking part 421 near the guiding slant 411 has a clicking slant 422. The clicking slant 422 and the guiding slant 411 are in parallel with each other.

The cantilever element 32 is received within the first space 43 and movable within the first space 43 and the second space 44. Moreover, while the cantilever element 32 is moved along the guiding slant 411 of the first protrusion post 41, the cantilever element 32 knocks on the clicking slant 422 of the clicking part 421. Especially, the pressing slant 321 of the cantilever element 32 is slidably contacted with the guiding slant 411 of the first protrusion post 41 and movable along the guiding slant 411.

The elastic mechanism 50 is arranged between the keycap 40 and the structural plate 20. A first side and a second side of the elastic mechanism 50 are connected with the structural plate 20 and the keycap 40, respectively. The elastic mechanism 50 further comprises a thin film layer 51 and an elastomer 52. The thin film layer 51 covers a top surface of the structural plate 20. The thin film layer 51 comprises a perforation 511, a first opening 512 and a second opening 513. The perforation 511 of the thin film layer 51 is located over the slot 21 of the structural plate 20. The first opening 512 is formed in a side of the thin film layer 51 near the perforation 511. Moreover, the first opening 512 of the thin film layer 51 is in communication with the perforation 511 of the thin film layer 51. The second opening 513 is formed in a side of the thin film layer 51 away from the perforation 511. The bulge 312 of the shaft body 31, the elastic element 33, the first protrusion post 41 and the second protrusion post 42 are penetrated through the perforation 511 of the thin film layer 51. The first coupling brackets 23 are penetrated through the first opening 512. The second coupling brackets 24 are penetrated through the second opening 513.

The elastomer 52 is made of rubber, silicone, resin or casting polyurethane. A first end of the elastomer 52 is connected with the thin film layer 51. A second end of the elastomer 52 is connected with the keycap 40. The elastomer 52 is dome-shaped. Moreover, a ring-shaped convex structure 521 is externally extended from a bottom side of the elastomer 52. The elastomer 52 is connected with the thin film layer 51 through the ring-shaped convex structure 521. A top side of the elastomer 52 is connected with the keycap 40.

The outer supporting frame 70 is coupled to the external portion of the inner supporting frame 60. For example, a middle region of a frame body of the outer supporting frame 70 is pivotally coupled to a middle region of a frame body of the inner supporting frame 60. The inner supporting frame 60 comprises a first inner coupling part 61 and a second inner coupling part 62. The first inner coupling part 61 and the second inner coupling part 62 are located at two opposite sides of the inner supporting frame 60, respectively. The second inner coupling part 62 is penetrated through the second opening 513 of the thin film layer 51. The outer supporting frame 70 comprises a first outer coupling part 71 and a second outer coupling part 72. The first outer coupling part 71 and the second outer coupling part 72 are located at two opposite sides of the outer supporting frame 70, respectively. The first outer coupling part 71 is penetrated through the first opening 512 of the thin film layer 51. The first inner coupling part 61 of the inner supporting frame 60 is pivotally coupled to the keycap 40. The two ends of the second inner coupling part 62 are pivotally coupled with the second coupling brackets 24 of the structural plate 20, respectively. The two ends of the first outer coupling part 71 are pivotally coupled to the first coupling brackets 23 of the structural plate 20, respectively. Moreover, the first outer coupling part 71 is received within the recess 22 of the structural plate 20. The second outer coupling part 72 is pivotally coupled to the keycap 40.

Figure 4:
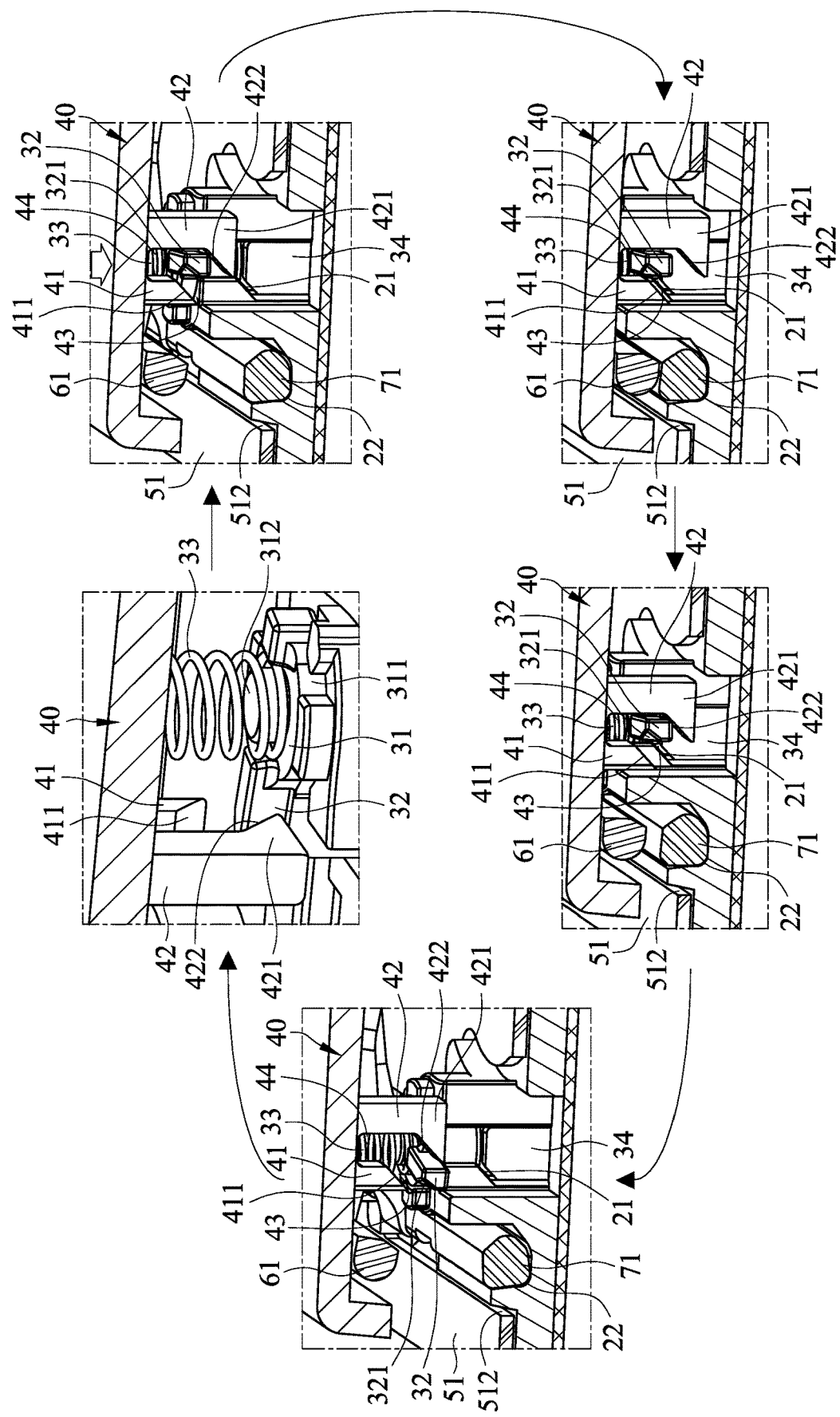
FIG. 4 schematically illustrates the operations of the key structure according to the embodiment of the present invention.

FIG. 4 schematically illustrates the operations of the key structure according to the embodiment of the present invention. Please refer to the leftmost diagram, the upper middle diagram and the upper right diagram of FIG. 4 sequentially. Firstly, the user's finger is placed on the keycap 40 to depress the keycap 40. As the keycap 40 is moved downwardly, the first protrusion post 41, the second protrusion post 42, the elastic element 33, the elastomer 52, the inner supporting frame 60 and the outer supporting frame 70 are correspondingly moved downwardly. While the first protrusion post 41 is moved with the keycap 40, the first protrusion post 41 presses the cantilever element 32 and provides a downward force to the cantilever element 32. As the keycap 40 is continuously moved downwardly, the cantilever element 32 is moved along the guiding slant 411 of the first protrusion post 41 in the direction toward the second protrusion post 42. At the same time, the cantilever element 32 in the first space 43 is moved in the direction toward the second space 44 and moved to the second space 44. While the first protrusion post 41 provides the downward force to the cantilever element 32 and the cantilever element 32 is gradually moved to the second space 44, the cantilever element 32 is subjected to flexible deformation. Consequently, the cantilever element 32 is staggered. When the cantilever element 32 is just introduced into the second space 44, the downward force from the first protrusion post 41 is no longer applied to the cantilever element 32. Consequently, the cantilever element 32 rocks and knocks on the clicking part 421 of the second protrusion post 42. Meanwhile, a click sound is generated. In other words, while the keycap 40 is depressed by the user, the key structure 100 can generate the feedback of the click sound. According to the feedback of the click sound, the user recognizes whether the key structure 100 is really depressed. Consequently, the tactile feel of depressing the key structure 100 is enhanced.

Please refer to the lower right diagram, the lower middle diagram and the leftmost diagram of FIG. 4 sequentially. After the user's finger is no longer placed on the keycap 40, the keycap 40 is moved upwardly in response to the elastic restoring forces of the elastomer 52 and the elastic element 33. As the keycap 40 is moved upwardly, the first inner coupling part 61 of the inner supporting frame 60 and the second outer coupling part 72 of the outer supporting frame 70 are moved upwardly. Consequently, the inner supporting frame 60 and the outer supporting frame 70 are switched from a horizontal state to vertical state. In other words, the inner supporting frame 60 and the outer supporting frame 70 crisscross each other. Under this circumstance, the inner supporting frame 60 and the outer supporting frame 70 provides a sufficient supporting force to support the weight of the keycap 40, which is returned to its original position.

In accordance with the present invention, the keycap 40 is equipped with the first protrusion post 41 and the second protrusion post 42. Since the first protrusion post 41 guides the cantilever element 32 to be in the staggered state, the second protrusion post 42 is knocked by the cantilever element 32. Consequently, the user may depress the key structure 100 to generate the click sound. When compared with the conventional technology, the key structure 100 of the present invention is simplified and cost-effective. Consequently, the assembling process is simplified, and the assembling cost is reduced.

Moreover, the first protrusion post 41 has the guiding slant 411, and the cantilever element 32 has the pressing slant 321. Since the pressing slant 321 is slidably contacted with the guiding slant 411, the cantilever element 32 is guided by the guiding slant 411 and successfully moved in the direction toward the second space 44. Moreover, since the cantilever element 32 of the pressing slant 321 is slidably contacted with the guiding slant 411, the friction between the cantilever element 32 and the first protrusion post 41 is reduced. In other words, the force for moving the cantilever element 32 toward the second space 44 is decreased. Since the cantilever element 32 is moved from the first space 43 to the second space 44 more easily, the operation of the key structure 100 is labor-saving.

Moreover, the clicking part 421 of the second protrusion post 42 has the clicking slant 422. When the cantilever element 32 is in the staggered state, the clicking part 421 is knocked by the cantilever element 32 more easily. Consequently, whenever the key structure 100 is depressed, the clicking slant 422 of the clicking part 421 is certainly knocked by the cantilever element 32. Under this circumstance, the click sound is generated.

As mentioned above, the keycap 40 is supported by the inner supporting frame 60 and the outer supporting frame 70. The middle region of the frame body of the outer supporting frame 70 is pivotally coupled to the middle region of the frame body of the inner supporting frame 60. Consequently, the inner supporting frame 60 and the outer supporting frame 70 crisscross each other. Under this circumstance, the space of the supporting structure within the key structure 100 is reduced. In other words, the efficacy of saving the space of the supporting structure is achieved. Since the occupied space of the key structure 100 is reduced, the mechanical keyboard with the key structure 100 is slim.

From the above descriptions, the key structure 100 of the present invention has the following features. Firstly, the first space 43 and the second space 44 are not aligned with each other. Consequently, while the cantilever element 32 is moved from the first space 43 to the second space 44, the cantilever element 32 knocks on second protrusion post 42 to generate the feedback of the click sound. Secondly, the keycap 40 is equipped with the first protrusion post 41 and the second protrusion post 42. While the cantilever element 32 is moved between the first protrusion post 41 and the second protrusion post 42, the feedback of the click sound is generated. Consequently, the structure is simplified, and the cost is reduced. Thirdly, the supporting frame 60 and the outer supporting frame 70 crisscross each other. Consequently, the space of the key structure is saved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A key structure, comprising:
a base plate;
a structural plate installed on the base plate, and comprising a slot;
a sound generation assembly comprising a shaft body, a cantilever element and an elastic element, wherein an end of the shaft body is connected with the base plate, a side of the shaft body is penetrated through the slot, the cantilever element is protruded from another side of the shaft body, and a first end of the elastic element is connected with the shaft body;
a keycap aligned with the structural plate, wherein a second end of the elastic element is away from the shaft body and connected with the keycap, a first protrusion post and a second protrusion post are disposed on a bottom surface of the keycap, the first protrusion post and the second protrusion post are penetrated through the slot, a first space is formed between a lower end of the first protrusion post and a lower end of the second protrusion post, a second space is formed between an upper end of the first protrusion post and an upper end of the second protrusion post near the keycap, the second space is in communication with the first space, and the first space and the second space are not aligned with each other, wherein the cantilever element is received within the first space and movable within the first space and the second space; and
an elastic mechanism arranged between the keycap and the structural plate, wherein a first side and a second side of the elastic mechanism are connected with the structural plate and the keycap, respectively,
wherein while the keycap is moved upwardly, a bottom surface of the first protrusion post presses the cantilever element and provides a downward force to the cantilever element, wherein in response to the downward force, the cantilever element is moved along the bottom surface of the first protrusion post and moved from the first space to the second space, wherein when the cantilever element is just moved into the second space, the cantilever element rocks and knocks on the second protrusion post to generate a click sound.

2. The key structure according to claim 1, wherein a side of the lower end of the first protrusion post near the second protrusion post has a guiding slant, and a side of the lower end of the second protrusion post facing the first protrusion post has a clicking part, wherein the first space is formed between the guiding slant and clicking part, and the first space is arranged between the guiding slant and the clicking part, wherein while the cantilever element is moved along the guiding slant, the cantilever element knocks on the clicking part.

3. The key structure according to claim 2, wherein a side of the cantilever element away from the shaft body has a pressing slant, wherein the pressing slant is slidably contacted with the guiding slant and movable along the guiding slant.

4. The key structure according to claim 3, wherein a side of the clicking part near the guiding slant has a clicking slant, wherein the clicking slant and the guiding slant are in parallel with each other, and the cantilever element is permitted to knock on the clicking slant.

5. The key structure according to claim 1, wherein the shaft body comprises a pedestal and a bulge, and the bulge is protruded from the pedestal, wherein the cantilever element is protruded from a side of the pedestal near the bulge, the pedestal is penetrated through the slot, and an end of the pedestal away from the bulge is connected with the base plate, wherein the elastic element is sheathed around the bulge and clamped between the pedestal and the keycap, the first end of the elastic element is fixed on the pedestal, and the second end of the elastic element is fixed on the keycap.

6. The key structure according to claim 5, wherein the sound generation assembly further comprises a fixing seat, wherein a first end of the fixing seat is connected with the base plate, a second end of the fixing seat is connected with an end of the pedestal away from the bulge, and the pedestal is fixed on the base plate through the fixing seat.

7. The key structure according to claim 5, wherein the elastic mechanism further comprises a thin film layer and an elastomer, wherein the thin film layer covers a top surface of the structural plate, and the thin film layer comprises a perforation, wherein the bulge, the elastic element, the first protrusion post and the second protrusion post are penetrated through the perforation of the thin film layer, a first end of the elastomer is connected with the thin film layer, and a second end of the elastomer is connected with the keycap.

8. The key structure according to claim 7, wherein the elastomer is dome-shaped, a ring-shaped convex structure is externally extended from a bottom side of the elastomer, the ring-shaped convex structure is connected with the thin film layer, and a top side of the elastomer is connected with the keycap.

9. The key structure according to claim 7, wherein the key structure further comprises an inner supporting frame and an outer supporting frame, wherein the outer supporting frame is coupled to an external portion of the inner supporting frame, a middle region of a frame body of the outer supporting frame is pivotally coupled to a middle region of a frame body of the inner supporting frame, the inner supporting frame comprises a first inner coupling part and a second inner coupling part, the first inner coupling part and the second inner coupling part are respectively located at two opposite sides of the inner supporting frame, the outer supporting frame comprises a first outer coupling part and a second outer coupling part, and the first outer coupling part and the second outer coupling part are respectively located at two opposite sides of the outer supporting frame, wherein the first inner coupling part is pivotally coupled to the keycap, the second inner coupling part is pivotally coupled with the structural plate, the first outer coupling part is pivotally coupled to the structural plate, and the second outer coupling part is pivotally coupled to the keycap.

10. The key structure according to claim 9, wherein the slot is formed in a side of the structural plate, and the structural plate comprises two first coupling brackets and two second coupling brackets, wherein the two first coupling brackets are disposed on the structural plate and located near the slot, the two second coupling brackets are disposed on the structural plate and located away from the slot, two ends of the first outer coupling part are respectively pivotally coupled to the two first coupling brackets, and two ends of the second inner coupling part are respectively pivotally coupled to the two second coupling brackets.

11. The key structure according to claim 10, wherein the thin film layer further comprises a first opening and a second opening, wherein the perforation is located over the slot, the first opening is formed in a side of the thin film layer near the perforation, the first opening is in communication with the perforation, the second opening is formed in a side of the thin film layer away from the perforation, the two first coupling brackets and the first outer coupling part are penetrated through the first opening, and the two second coupling brackets and the second inner coupling part are penetrated through the second opening.

12. The key structure according to claim 11, wherein the structural plate further comprises a recess, wherein the recess is arranged between the two first coupling brackets, and the first outer coupling part is received within the recess.

13. The key structure according to claim 7, wherein the elastic element is a spring, the elastomer is made of rubber, silicone, resin or casting polyurethane, and the cantilever element is made of a flexible material.

* * * * *